United States Patent Office 2,857,286
Patented Oct. 21, 1958

2,857,286

MANUFACTURE OF PORTLAND CEMENT

Ralph H. Striker, Independence, Mo., assignor to Missouri Portland Cement Company, St. Louis, Mo., a corporation of Missouri No Drawing. Application November 23, 1955
Serial No. 548,784

4 Claims. (Cl. 106—90)

This invention relates generally to controlling the flow properties of dry, fine-ground mineral material as exemplified by Portland cement. This application is a continuation-in-part of my application Serial Number 137,276, now abandoned, filed January 6, 1950.

Persons familiar with the handling of Portland cement are aware of the fact that the cement has very poor flowing properties. When stored in bulk and allowed to settle, untreated cement packs so tightly that it frequently hangs up and refuses to flow under gravity to the extent that the condition is aptly called in the trade, "dry setting." The same condition obtains when cement is packed in sacks or barrels, although due to the fact that the quantities are of relatively small magnitude when so packed, the difficulties are not so serious. When large quantities of cement are involved, such, for example as in its storage and in the course of its transportation in hopper cars and barges, the failure of the cement to flow under gravity presents a very serious handling difficulty. Likewise, in the pumping of cement through pipe lines, extreme care must be taken, else the lines will clog and require to be manually dislodged.

Other fine-ground mineral materials, particularly those which have been burned, as exemplified by line, exhibit the same type of disinclination to flow, though of a less aggravating degree than is exhibited by Portland cement. It has long been the custom to treat cement clinker with what is known in the trade as "yellow grease," an oleaginous material, in the grinding process, to improve the grinding characteristics of the cement. However, while the addition of oleaginous materials used heretofore has improved the grinding characteristics of the cement and temporarily improved its flow properties, it has had a number of disadvantages. Cement so treated is still subject to dry setting in storage, losing most, if not all, of its improved flow characteristics. Furthermore, the oleaginous materials render the cement particles water repellent, which makes the cement hard to mix with water, and they frequently produce foam, which is also undesirable.

The object of the present invention, generally stated, is to provide a free-flowing Portland cement or similar material, in which dry-setting is minimized, which is not water repellant and which does not produce foam when mixed with water.

Another object of the invention is to provide a process of treating Portland cement and similar materials, whereby the same are rendered free-flowing without deleteriously affecting their desirable properties.

This invention is predicated upon the discovery that dry Portland cement particles, which are treated with a modicum of acetic acid or a water soluble salt of acetic acid the solubility of which is greater than calcium acetate, become practically as free flowing as water.

Generally stated, therefore, the invention contemplates the treatment of calcareous particles such as Portland cement and lime, while dry (i. e., free of moisture other than that contained in the ambient air) with such an acetate. The term "acetate" is used hereinafter to indicate broadly acetic acid and those water soluble salts of acetic acid which have greater solubility than calcium acetate. The cement so treated retains its free flowing characteristics, does not pack or dry set in bulk storage, does not repel water, and does not foam when mixed with water.

The amount of treating material, calculated as acetic acid, may be as small as .01% of the dry weight of the cement. Up to about 1.0%, the setting and strength properties of the cement are not adversely affected in any substantial way. Excesses over 1.0% of acetic acid do decrease the strength of the cement, when ground to a fineness such as to present a surface of 2300 square centimeters per gram, as determined on a Wagner Turbidimeter.

Treatment with the acetate in accordance with the present invention is carried out either concurrently with, or subsequent to, the grinding of the cement clinker. Where the acetate is contacted with the cement clinker concurrently with the grinding, it may be fed into the ball mill, or other comminuting apparatus, at any suitable point in the operation, most conveniently at the feed end of the apparatus. The feed stream is regulated so that the desired proportions of acetate to clinker will prevail. Alternatively, the clinker may be ground in the usual manner, and the ground product collected in any suitable vessel into which acetic acid may be injected under pressure, as a vapor, so as to blow the cement, and uniformly contact the particles thereof with the acid vapor. In either event, the cement is dry when contacted with the acetate.

Where the cement is ground to a fineness of 60 microns or less, and presents a surface of 2300 square centimeters per gram, 0.02% of acetate, calculated as acetic acid, produces the desired free-flowing property. Higher percentages of acetate produce no improvement in the flow properties, but, as aforesaid, at about 1.0% of acid, a loss of strength in the cement is observable.

The reason for the effectiveness of this treatment is not fully understood, but it is significant that a comparable result cannot be obtained by grinding together cement and calcium acetate.

In the case of the salts of acetic acid which have a greater solubility than calcium acetate, a reaction proceeds according to the laws of mass action toward the formation of calcium acetate. This reaction can only proceed when the salts are ionized, but sufficient water is always picked up by the cement particles from the ambient atmosphere, where it exists in the vapor state, to permit the formation of calcium acetate throughout the mass, each cement particle being individually coated.

Examples of water soluble salts of acetic acid which will produce the desired results are ammonium acetate, aluminum acetate, cobalt acetate, ferrous acetate, sodium acetate, and potassium acetate. Numerous other salts of acetic acid which meet the requirement of being more soluble than calcium acetate will occur to those skilled in the art. Examples of salts of acetic acid which are less soluble than calcium acetate and hence are unsuited, are copper acetate, chromium acetate, bismuth acetate and ferric acetate.

It can be seen that when .01% to 1.0%, by weight of dry cement, of acetate, calculated as acetic acid is used, the amount of calcium acetate in the finished material will be approximately .013% to 1.3% by weight of the treated material. Actual percentages of various suitable salts of acetic acid calculated as .02% of acetic acid are: sodium acetate, .027%; potassium acetate, .033%; ammonium acetate, .029%; and aluminum (tri) acetate, .023%.

While the invention has been disclosed with particular reference to the treatment of Portland cement, it is pointed out that the principles thereof are applicable to the treatment of burned lime and other calcareous materials, which normally exhibit a tendency to pack, and present sharp angles of repose when stored in bulk.

Having thus described the invention, what is claimed and desired to be secured by Letters Patent is:

1. The process of treating Portland cement of the character which has a tendency to dry set, to make the cement free flowing without rendering it water repellent, which comprises contacting dry particles of said Portland cement in air with a material taken from the group consisting of acetic acid and water soluble salts of acetic acid having a greater solubility than calcium acetate, in an amount, calculated as acetic acid, between about 0.01% and 1.0% by weight of the dry cement, and forming calcium acetate in situ on said particles.

2. A manufacture comprising fine ground Portland cement particles coated with calcium acetate deposited in situ thereon in accordance with the process of claim 1.

3. A manufacture comprising particles of a fine ground burned material taken from the group consisting of Portland cement and lime, upon which calcium acetate has been deposited in situ in accordance with the process of claim 1, the calcium acetate constituting between .013% and 1.3% by weight of the material.

4. The process of treating Portland cement of the character which has a tendency to dry set, to make the cement free flowing without rendering it water repellent, comprising vaporizing acetic acid, contacting dry particles of said Portland cement in air with the acetic acid vapors produced and forming calcium acetate in situ on said particles, said calcium acetate constituting between about .013% and 1.3% by weight of the dry cement.

References Cited in the file of this patent
UNITED STATES PATENTS

| | | |
|---|---|---|
| 346,525 | Anderson | Aug. 3, 1886 |
| 747,689 | Feely | Dec. 22, 1903 |
| 1,640,602 | Dittinger | Aug. 30, 1927 |
| 1,947,504 | Starke | Feb. 20, 1934 |
| 1,957,415 | Wechter | May 1, 1934 |
| 1,979,380 | Gardner | Nov. 6, 1934 |